No. 788,677. PATENTED MAY 2, 1905.
C. W. SHERMAN.
CAR WHEEL.
APPLICATION FILED MAR. 15, 1904.

No. 788,677. Patented May 2, 1905.

UNITED STATES PATENT OFFICE.

CLIFTON W. SHERMAN, OF BELLEVUE, PENNSYLVANIA.

CAR-WHEEL.

SPECIFICATION forming part of Letters Patent No. 788,677, dated May 2, 1905.

Application filed March 15, 1904. Serial No. 198,269.

*To all whom it may concern:*

Be it known that I, CLIFTON W. SHERMAN, a citizen of the United States, residing at Bellevue, in the county of Allegheny and State of Pennsylvania, have invented new and useful Improvements in Car-Wheels, of which the following is a specification.

My invention relates to improvements in car-wheels, and more particularly to cast-iron car-wheels for railway-cars.

To this end my invention consists of a new and improved car-wheel and in the novel features of construction and arrangement of parts, all as fully hereinafter described and claimed.

Figure 1:
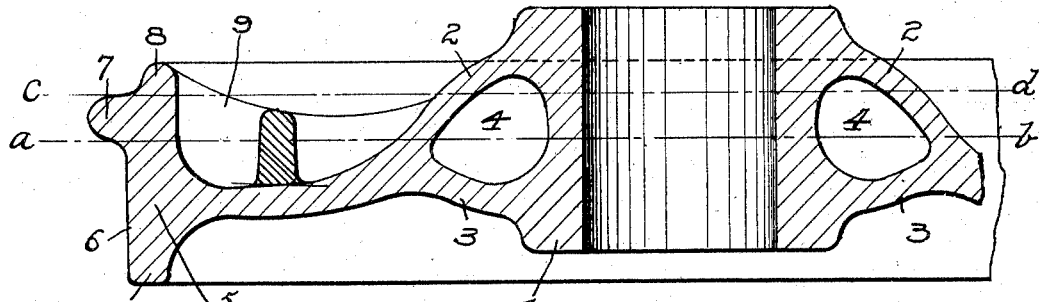
Figure 2:
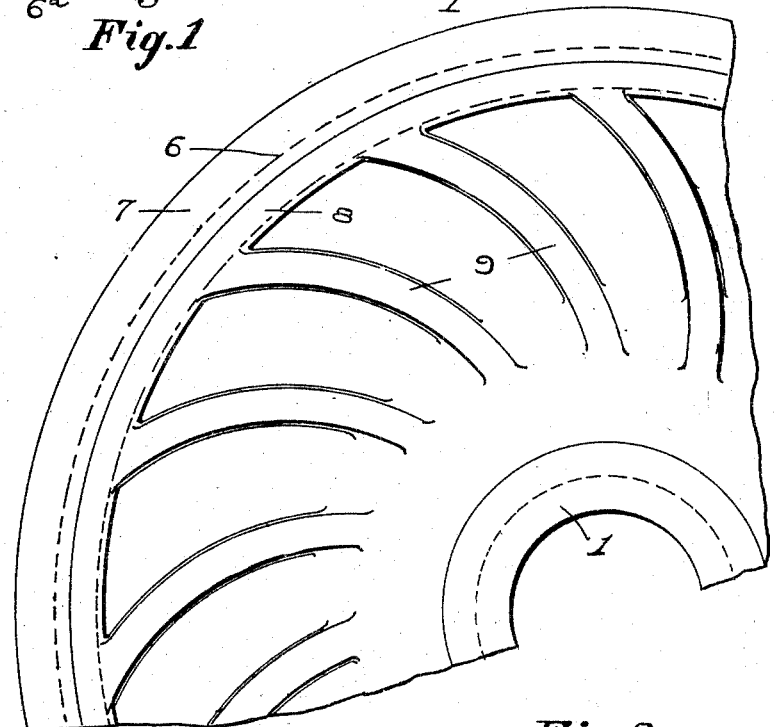

In the accompanying drawings, which illustrate an application of my invention, Figure 1 is a sectional view of a part of a wheel constructed in accordance with my invention, and Fig. 2 a back elevation of a part of the wheel.

Much trouble has heretofore occurred from the use of chilled cast-iron wheels caused by the breaking of the wheels, and since the introduction of very heavy cars of large capacity the trouble arising from breakage of the wheels in service has increased. With a view of obviating this trouble car-wheel makers have endeavored to strengthen the wheels by the employment of heavier sections without changing the general design of the wheels. Such changes have not produced the desired results, and wheels continue to break.

Cast-iron wheels in service have demonstrated that most of the breaks occur either at the throat of the wheel or in the flange. Consequently in order to strengthen the wheel attention must be directed toward strengthening those parts. It is known, however, that the rim or tread-section of the wheel cannot be increased very much in thickness and at the same time be properly chilled, also that the flange cannot be increased in thickness above the tread and between the rail-line and gage-line of the back of the flange on account of the limitations imposed by guard and wing rail distances. In my form of wheel I have a comparatively light tread-section, but increase the strength of the wheel at its weakest parts by the addition of a portion placed below the tread and outside of the gage-line of the back of the flange and by employment of the brackets, as shown.

Referring to the drawings, the wheel comprises a hub 1, plates 2 and 3, with the usual core-opening 4, a chilled tread-section 5, having a tread-surface 6, a rim-section $6^a$, and a flange 7. In Fig. 1 the line $a\,b$ represents the rail-line, and $c\,d$ the gage-line, of the back of the flange.

The novel and characteristic features of the present invention comprise the projecting portion 8 and the brackets or arms 9. Portion 8, which is cast integral with the wheel, projects outwardly from the tread-section and extends to a point beyond the gage-line of the back of the flange. It is located below the tread-line of the wheel, allows for the usual wear, and will not interfere with guard-rails, frogs, and crossings. The brackets or arms 9, which may be of any suitable number, also extend beyond the gage-line of the back of the flange and terminate in the portion 8. By this construction I am enabled to employ a light tread-section and at the same time greatly strengthen the wheel.

I desire to call attention to the fact that in the process of making wheels of the form of my invention I am enabled to prevent what has heretofore been the cause of much trouble. In casting wheels of the usual form the first metal poured enters into the formation of the flange portion. This metal overflows through the brackets and immediately strikes the chiller. The result of this is to cause the flange portion of the wheel to set more quickly than is desirable and to sometimes form a strain in the casting at the throat of the wheel.

In casting my form of wheel the projecting portion 8 will be formed before the flange portion, thereby providing hotter metal for forming the flange. This hotter metal, together with the metal employed for forming portion 8, prevents the flange-section from setting quicker than the tread-section. The result is the production of a better wheel free of strains in the throat.

What I claim is—

1. A car-wheel formed of a single casting having a flange, means for strengthening the wheel comprising a portion integral with the tread-section and projecting therefrom to a point beyond the gage-line of the back of the flange, and a series of brackets, substantially as set forth.

2. A car-wheel having a flange, means for strengthening the wheel comprising a projecting portion extending from the tread-section to a point beyond the gage-line of the back of the flange, and a series of brackets, said brackets extending to a point beyond the gage-line of the back of the flange, substantially as set forth.

In testimony whereof I have signed my name to this specification in the presence of two subscribing witnesses.

CLIFTON W. SHERMAN.

Witnesses:
W. G. DOOLITTLE,
MARGARET HUGHES.